(12) United States Patent
Shimoda

(10) Patent No.: US 9,981,428 B2
(45) Date of Patent: May 29, 2018

(54) METHOD OF MANUFACTURING RIM OF WHEEL

(71) Applicant: HONDA MOTOR CO., LTD., Tokyo (JP)

(72) Inventor: Shinsuke Shimoda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 282 days.

(21) Appl. No.: 15/040,242

(22) Filed: Feb. 10, 2016

(65) Prior Publication Data

US 2016/0236424 A1 Aug. 18, 2016

(30) Foreign Application Priority Data

Feb. 16, 2015 (JP) .................................. 2015-027752

(51) Int. Cl.
*B60B 5/02* (2006.01)
*B29C 70/32* (2006.01)
*B29K 105/08* (2006.01)
*B29K 307/04* (2006.01)
*B29L 31/32* (2006.01)

(52) U.S. Cl.
CPC .......... *B29C 70/32* (2013.01); *B29K 2105/08* (2013.01); *B29K 2307/04* (2013.01); *B29L 2031/32* (2013.01); *B60B 5/02* (2013.01); *B60B 2900/111* (2013.01)

(58) Field of Classification Search
CPC ................ B60B 5/02; B60B 2900/111; B60B 2900/112; B60B 2900/113; B60B 2360/34–2360/3424; B60B 21/00; B60B 21/04; B29L 2031/32; B29C 70/02; B29C 70/021; B29C 70/026; B29C 70/028; B29C 70/30; B29C 70/32; B29C 70/347; B29C 70/462

See application file for complete search history.

(56) References Cited

U.S. PATENT DOCUMENTS

2014/0333122 A1* 11/2014 Werner ................... B29C 70/34
301/95.102

FOREIGN PATENT DOCUMENTS

EP 2363273 A1 * 9/2011 ............ B29B 11/16
JP 2-261630 A 10/1990

* cited by examiner

*Primary Examiner* — Carson Gross
(74) *Attorney, Agent, or Firm* — Westerman, Hattori, Daniels & Adrian, LLP

(57) ABSTRACT

A plurality of continuous fiber reinforced plastics is placed substantially in parallel on the outer circumferential surface of a mold for rim formation so as to be aligned with the direction of an axis of the mold to cover the surface. In addition, the continuous fiber reinforced plastics is applied and laminated on a continuous fiber reinforced plastic layer including the continuous fiber reinforced plastics placed on the outer circumferential surface of the mold, the continuous fiber reinforced plastics being substantially in parallel and aligned with the direction of the axis of the mold. Furthermore, a restraint material is wound around the continuous fiber reinforced plastic layer disposed at level difference portions of the mold using the axis as a winding center.

9 Claims, 5 Drawing Sheets

METHOD OF MANUFACTURING RIM OF WHEEL

CROSS REFERENCES TO RELATED APPLICATIONS

The present application claims priority under 35 U.S.C. §119 to Japanese Patent Application No. 2015-027752, filed Feb. 16, 2015, entitled "Method of Manufacturing Rim of Wheel." The contents of this application are incorporated herein by reference in their entirety.

TECHNICAL FIELD

The present disclosure relates to a method of manufacturing a rim of a wheel, by which a rim is manufactured using continuous fiber reinforced plastics as a material.

BACKGROUND

Development of wheel weight reduction technology as a measure for improvement in the fuel efficiency of an automobile and improvement in the motion performance of a vehicle has been advanced. As an application of such technology, wheels have been developed in which fiber reinforced plastics (hereinafter, referred to as FRP) are used as a material, and particularly carbon fiber reinforced plastics (hereinafter, referred to as CFRP) including carbon fiber is used as a reinforcement material.

For instance, Japanese Unexamined Patent Application Publication (JP-A) No. 2-261630 discloses a method by which the rim of a wheel is manufactured by so-called filament winding molding method (FW method) in which filament reinforced fiber, which is impregnated with a resin, is wound around a mandrel. According to the method described in JP-A No. 2-261630, a rim is formed by rotating a rim-shaped mandrel to wind a filament around the mandrel.

The FW method described in JP-A No. 2-261630 is one of the techniques that take advantage of the strength of reinforced fiber. On the other hand, a technology has been developed, in which when an overall convex shaped member such as a gas tank is created by the FW method, a great number of continuous fiber reinforced plastics is provided in an axial direction, thereby reducing the time taken to laminate the plastics. However, there is a problem in that when the continuous fiber reinforced plastics is provided in a concave shaped member such as a rim of a wheel, it is difficult to guide the continuous fiber reinforced plastics into the mold of the wheel.

SUMMARY

The present disclosure has been made in consideration of such a problem. On embodiment of a method of manufacturing a wheel rim allows continuous fiber reinforced plastics to be laminated with high accuracy around a mold for a wheel rim that has a concave shape in an outer circumference width direction.

One embodiment of the present disclosure provides a method of manufacturing a wheel rim, including: fully placing a plurality of continuous fiber reinforced plastics on an outer circumferential surface of a mold for rim formation, the continuous fiber reinforced plastics being substantially in parallel to be aligned with an axial direction of the mold; winding a restraint material around a continuous fiber reinforced plastic layer disposed at a level difference portion of the mold after the placing of the continuous fiber reinforced plastics or during the placing of the continuous fiber reinforced plastics, the restraint material being configured to restrict movement of the continuous fiber reinforced plastics to a radially outer side of the mold; and applying the continuous fiber reinforced plastics to the continuous fiber reinforced plastic layer applied to the mold after the placing of the continuous fiber reinforced plastics or during the winding of the restraint material, the continuous fiber reinforced plastics being substantially in parallel to be aligned with an axial direction of the mold. Accordingly, the continuous fiber reinforced plastic layer laminated on the outer circumferential surface of the mold is restricted from moving to radially outer side of the mold by the restraint material, and thus it is possible to cause the continuous fiber reinforced plastics to keep track of the mold of a rim having a concave shape and to be applied and laminated substantially in parallel so as to be aligned with the axial direction of the mold. Therefore, it is possible to laminate the continuous fiber reinforced plastics with high accuracy around the mold for a wheel rim that has a concave shape in the outer circumference width direction. Furthermore, a rim laminated body having a predetermined thickness may be laminated quickly, and thus the time taken for the lamination may be reduced.

In one embodiment, a plurality of continuous fiber reinforced plastics is fully placed substantially in parallel on the outer circumferential surface of a mold for rim formation so as to be aligned with the axial direction of the mold. In addition, continuous fiber reinforced plastics is applied and laminated on continuous fiber reinforced plastic layers formed of the plurality of continuous fiber reinforced plastics fully placed on the outer circumferential surface of the mold, the continuous fiber reinforced plastics being substantially in parallel so as to be aligned with the axial direction. Furthermore, the restraint material is wound around the axis as the center for the continuous fiber reinforced plastic layer disposed at a level difference portion of the mold. In this manner, movement of the continuous fiber reinforced plastic layer is restricted by the restraint material and thus movement of the continuous fiber reinforced plastic layer is protected and it is possible to laminate the continuous fiber reinforced plastics with high accuracy around the mold for a wheel rim that has a concave shape in the outer circumference width direction. Furthermore, since a great number of continuous fiber reinforced plastics is supplied and substantially arranged in parallel without space in the axial direction of the mold in the present disclosure, a rim laminated body having a predetermined thickness may be laminated more quickly than the case that the continuous fiber reinforced plastics is wound and laminated in the outer circumferential direction of the mold, and thus the time taken for the lamination may be reduced.

Also, the method of manufacturing a wheel rim may further include folding back an edge of a laminated body, in which the continuous fiber reinforced plastics is laminated, to an outer circumferential surface side or an inner circumferential surface side of the laminated body after the applying of the continuous fiber reinforced plastics for one or more layers. The flange formation process allows the thickness of the flange of the rim to be increased to enhance the strength of the flange.

BRIEF DESCRIPTION OF THE DRAWINGS

The advantages of the disclosure will become apparent in the following description taken in conjunction with the following drawings.

DETAILED DESCRIPTION

Hereinafter, a preferred embodiment of a method of manufacturing a wheel rim according to the present disclosure will be described in detail with reference to the accompanying drawings.

[Structure of Wheel 10]

Figure 1A:
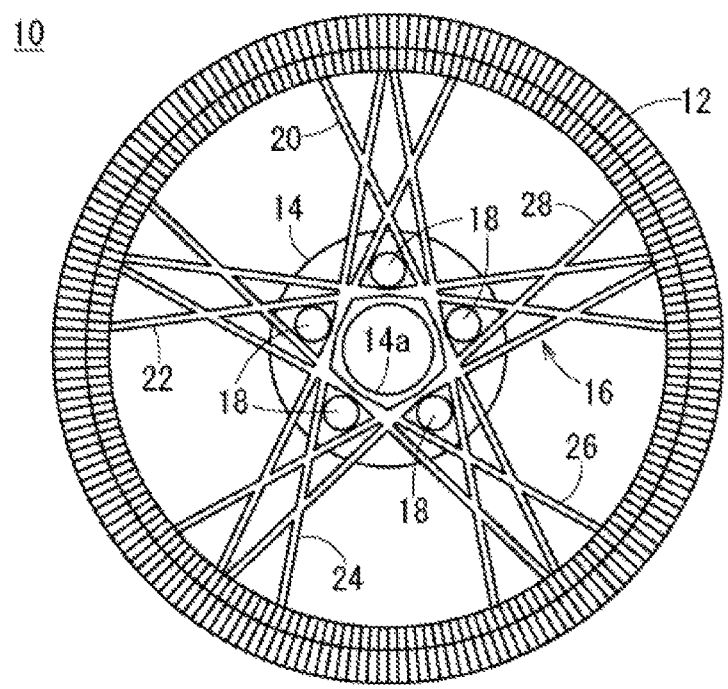
FIG. 1A is a front view illustrating the external appearance of a wheel.
Figure 1B:
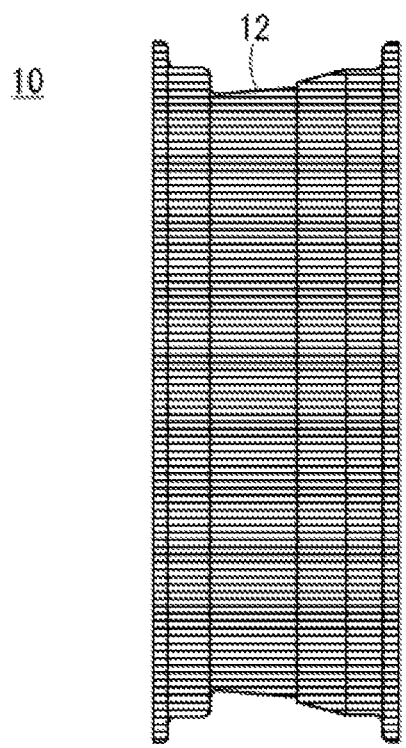
FIG. 1B is a right side view illustrating the external appearance of the wheel.

First, FIG. 1A and FIG. 1B are referenced to describe the structure of a wheel 10. The wheel 10 mainly includes a cylindrical rim 12, a hub 14 located at the center of the rim 12, and a spoke 16 that is provided between the rim 12 and the hub 14. The spoke 16 has five spokes 20, 22, 24, 26, 28 that are integrally molded. In FIG. 1A and FIG. 1B, the plurality of lines which transverse the outer circumferential surface of the rim 12 explain arrangement direction of filaments of FRP.

The rim 12 is formed by laminating a filament or bundle of filaments including carbon fiber and resin. In the present description, the filament or the bundle of filaments is to be continuous fiber reinforced plastics 32 (see FIG. 3A). The continuous fiber reinforced plastics 32 is also referred to as a unidirectional reinforced material, a unidirectional reinforced composite material, or a UD material. A plurality of continuous fiber reinforced plastics 32 is disposed substantially in parallel to each other in the axial direction (width direction) of the rim 12 in accordance with the shape of the rim 12.

In the hub 14, five insert members 18 made from metal are disposed and embedded at regular intervals so as to surround a bore 14a. Each of the insert members 18 is located on the extension of a corresponding one of the spokes 20, 22, 24, 26, 28. The axial tension against tightening of a nut is ensured by the insert member 18 made from metal.

Similarly to the rim 12, the five spokes 20, 22, 24, 26, 28 are formed by laminating a filament or bundle of filaments including carbon fiber and resin. It is to be noted that the spokes 20, 22, 24, 26, 28 may be molded from metal.

[Structure of Mold 40 for Rim Formation]

A mold (mandrel) 40 for rim formation used in the later-described embodiment will be described with reference to FIG. 2A and FIG. 2B. As illustrated in FIG. 2B, the mold 40 for rim formation used in the present embodiment includes two molds 42A, 42B for spoke formation, two caps 46A, 46B, and a spacer 48. The molds 42A, 42B, the caps 46A, 46B, and the spacer 48 are made from metal. It is to be noted that the mold 40, the caps 46A, 46B, and the spacer 48 may be a resin.

Figure 2A:
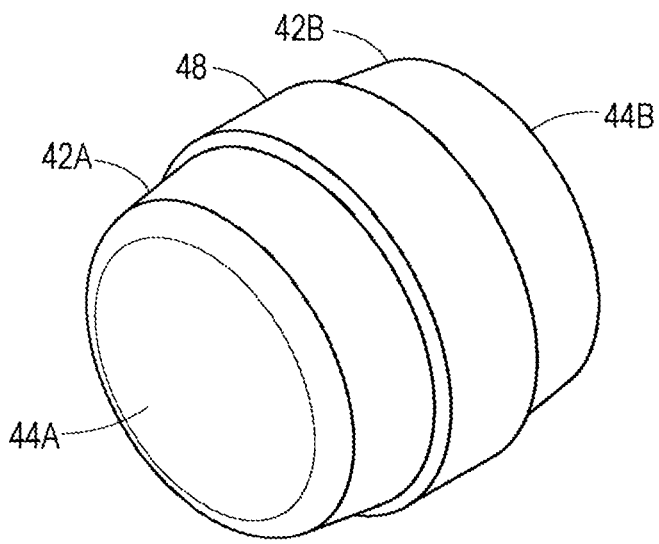
FIG. 2A is a perspective view illustrating the external appearance of a mold for spoke formation.
Figure 2B:
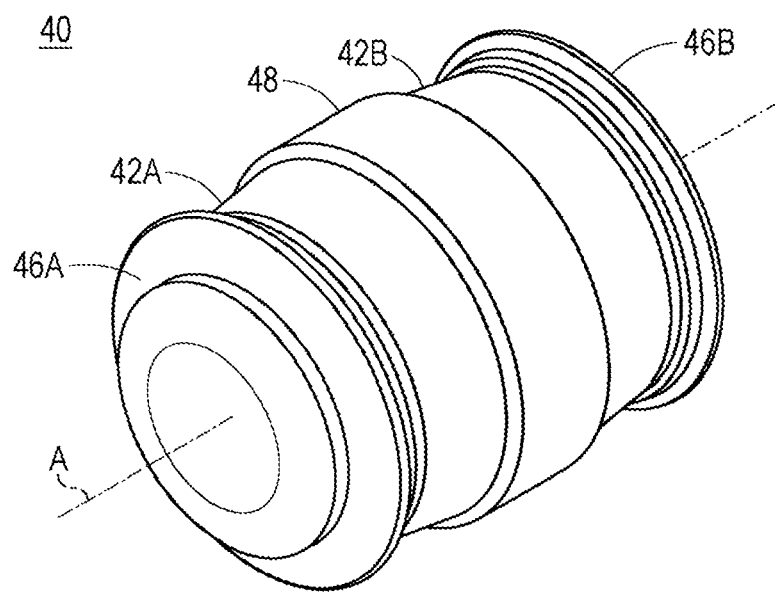
FIG. 2B is a perspective view illustrating the external appearance of a mold for rim formation.

As illustrated in FIG. 2A, the two molds 42A, 42B for spoke formation are combined by the spacer 48. When a filament or bundle of filaments including carbon fiber and resin are laminated on surfaces 44A, 44B of the molds 42A, 42B, a laminated body corresponding to the spoke 16 is formed on the surfaces 44A, 44B. Next, as illustrated in FIG. 2B, the caps 46A, 46B are mounted on the surfaces 44A, 44B of the molds 42A, 42B. In this state, the outer circumferential surface of the mold 42A and the outer circumferential surface of the cap 46A present the shape of the inner circumferential surface of the rim 12. Similarly, the outer circumferential surface of the mold 42B and the outer circumferential surface of the cap 46B present the shape of the inner circumferential surface of the rim 12. Two rims 12, 12 can be molded by the mold 40. Although the two rims 12, 12 are formed at once in the present embodiment, it is also possible to mold one rim or three or more rims at once.

[Method of Manufacturing Rim 12]

Figure 3A:
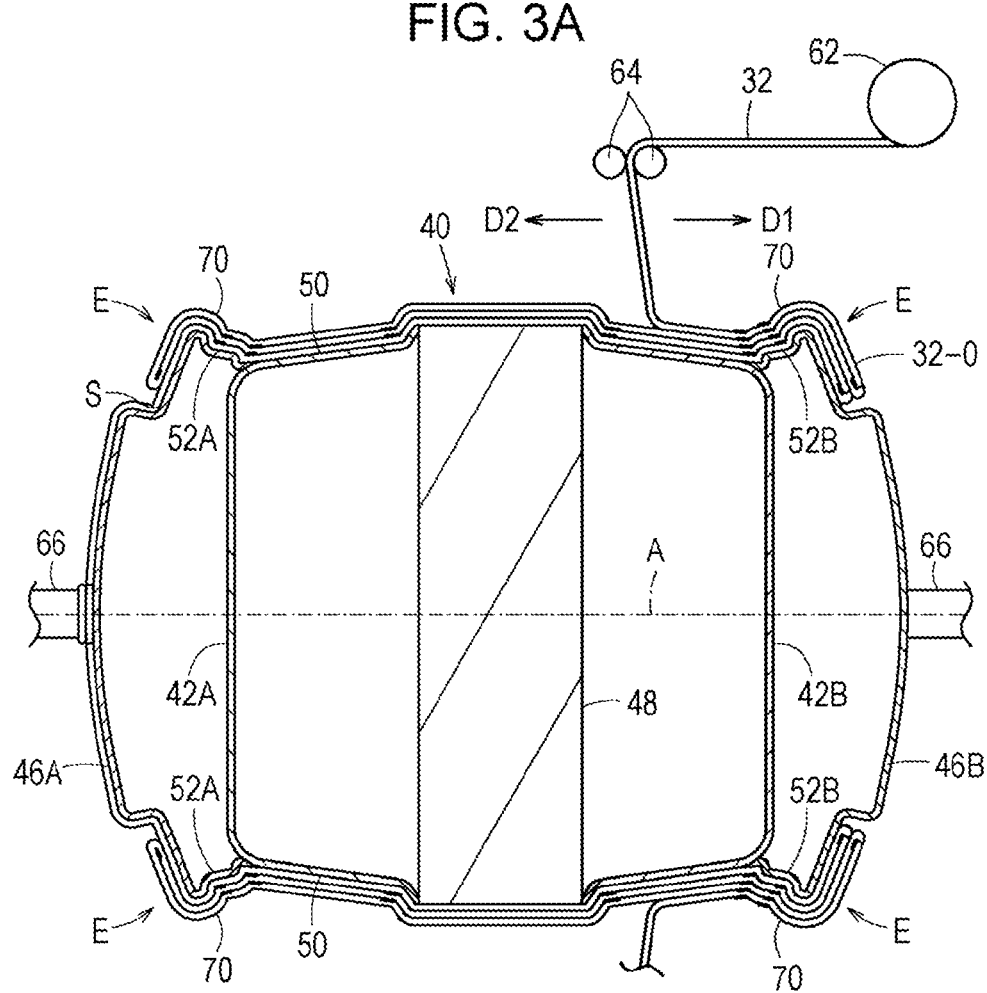
FIG. 3A is a sectional view presented for the description of a method of manufacturing a wheel rim according to the present embodiment.
Figure 3B:
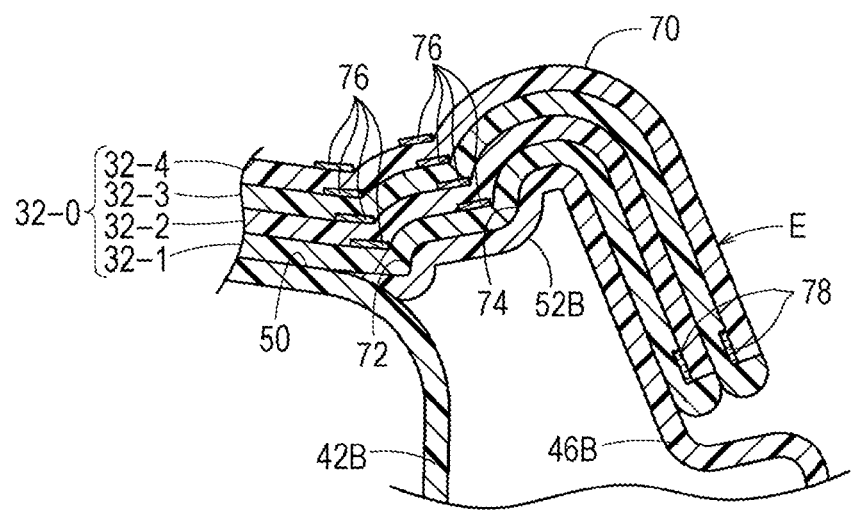
FIG. 3B is a view illustrating the flange in FIG. 3A on an enlarged scale.

The method of manufacturing the rim of the wheel 10 according to the present embodiment will be described with reference to FIG. 3A, FIG. 3B. FIG. 3A and FIG. 3B each illustrate a sectional view taken along a plane parallel to an axis A of the mold 40, and illustrate the manner in which continuous fiber reinforced plastics 32 are laminated on an outer circumferential surface 50 of the mold 40. It is to be noted that for the sake of description, in FIG. 3A, FIG. 3B, a laminated body 32-0 of the continuous fiber reinforced plastics 32 laminated on the outer circumferential surface 50 is illustrated on an enlarged scale.

Figure 4:
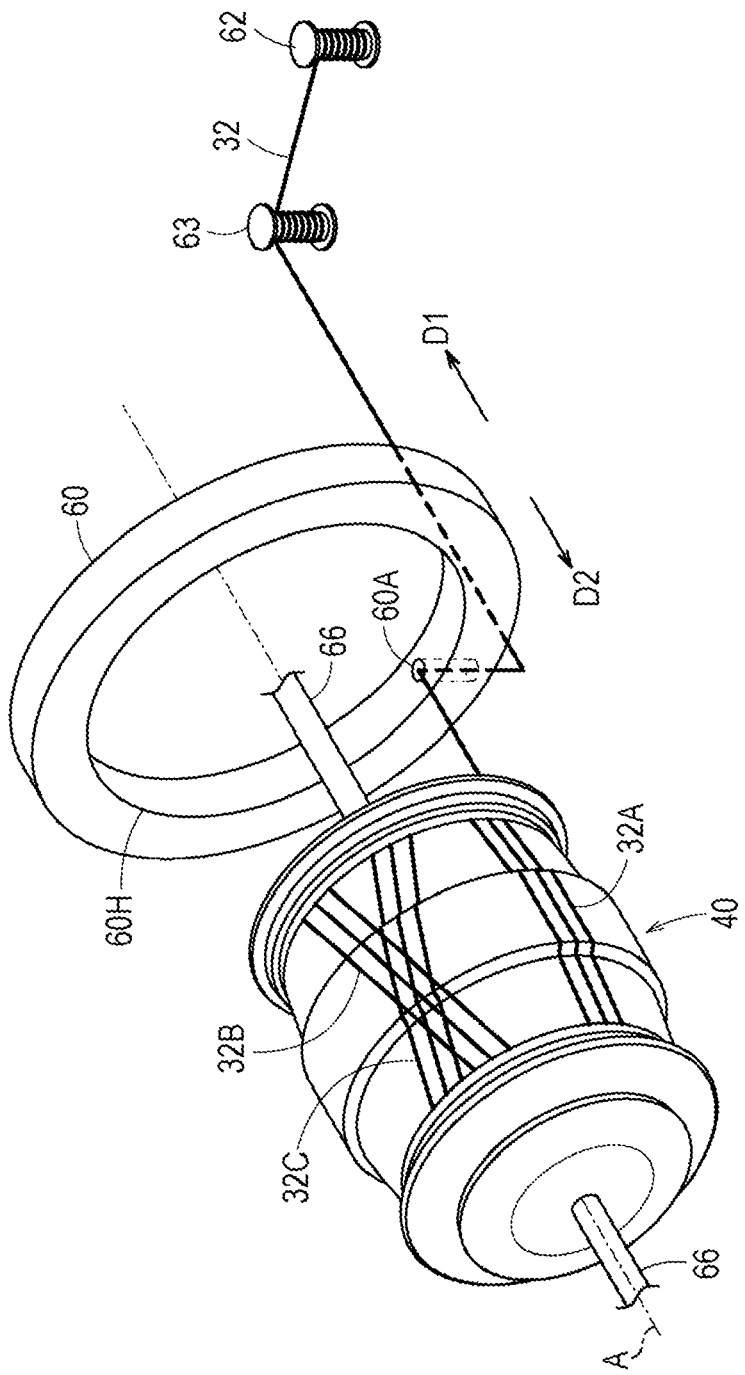
FIG. 4 is a perspective view illustrating the external appearance of a guide device and the mold for rim formation.

The present embodiment performs a fiber installation process, one or more restraint processes in a circumferential direction, and one or more fiber lamination processes. In those processes, it is possible to use, for instance, the guide device 60 illustrated in FIG. 4. The guide device 60 includes a through hole 60H through which the mold 40 can be passed. Also, the inner and outer circumferences of the through hole 60H are provided with a guide hole 60A for supplying the continuous fiber reinforced plastics 32. Although only one guide hole 60A is illustrated in FIG. 4, a plurality of (for instance, 180) guide holes 60A is practically provided radially in the outer circumferential direction of the mold 40 around the center of the axis A of the mold 40 so that the continuous fiber reinforced plastics 32 are applied in parallel along the outer circumference of the mold 40 in the fiber installation process and the fiber lamination process. The continuous fiber, which passes through each guide hole 60A, is supplied from a bobbin 62 via a tensioner 63, a friction element (not illustrated) upstream of the guide hole, the bobbin 62 being installed corresponding to the guide hole 60A. The guide device 60 is fixed. On the other hand, the mold 40 is supported by an end shaft 66, and is relatively movable in the directions (D1, D2) parallel to the axis A.

Before the rim 12 is manufactured, a laminated body (not illustrated) of the spoke 16 is formed by using the two molds 42A, 42B illustrated in FIG. 2A. In this process, the hub 14 is also disposed in the molds 42A, 42B. After the spoke 16 is formed, the caps 46A, 46B are attached onto the surfaces 44A, 44B of the molds 42A, 42B to form the mold 40 for rim formation. After the mold 40 is formed, the following fiber installation process, restraint process, and fiber lamination process are performed.

The fiber installation process is a process in which a plurality of continuous fiber reinforced plastics 32 is fully placed substantially in parallel on the outer circumferential surface 50 of the mold 40 for rim formation so as to be aligned with the direction of the axis A of the mold 40. First, the distal end of the continuous fiber reinforced plastics 32 is pulled out from the bobbin 62 and is passed through guide rollers 64 and is wound around the end shaft 66 to be placed on the surface of the cap 46A. Position S at which the continuous fiber reinforced plastics 32 is applied is the starting point of the continuous fiber reinforced plastics 32.

After the continuous fiber reinforced plastics 32 is applied at the position S, the continuous fiber reinforced plastics 32 is fully placed on the outer circumferential surface 50 of the mold 40 while the mold 40 is moved in the D2 direction. At this point, each of the continuous fiber reinforced plastics 32 is guided to the outer circumferential surface 50 of the mold 40 so that the continuous fiber reinforced plastics 32 are substantially arranged in parallel without space therebetween in the direction of the axis A of the mold 40. The mold 40 is moved in the D2 direction, and when the position, at which the continuous fiber reinforced plastics 32 is installed on the outer circumferential surface 50 of the mold 40, exceeds a flange 52B of the cap 46B of the mold 40, the fiber installation process is terminated. In this manner, the plurality of continuous fiber reinforced plastics 32 is fully placed on the outer circumferential surface 50 of the mold 40, and a first continuous fiber reinforced plastic layer 32-1 is formed. It is to be noted that an edge E of the continuous fiber reinforced plastic layer 32-1 is applied to the surface of the caps 46A, 46B.

The first restraint process is a process which is performed after the fiber installation process or during the fiber installation process and in which a restraint material 76 is wound around continuous fiber reinforced plastic layer 32-1 disposed at level difference portions 72, 74 of the mold 40, the restraint material 76 restricting the movement of the continuous fiber reinforced plastics 32 to radially outward of the mold 40. The outer circumferential surface 50 of the mold 40 has a plurality of level difference portions. For instance, as illustrated in FIG. 3B, the flange 52B has the level difference portions 72, 74. Since adhesive power of the continuous fiber reinforced plastics 32 is weak, when it is extended in the direction of the axis A of the mold 40, detachment is likely to occur at the level difference portions 72, 74. In this case, the continuous fiber reinforced plastics 32 moves to the radially outer side of the mold 40 due to tension, and space occurs between the continuous fiber reinforced plastics 32 and the outer circumferential surface 50 of the mold 40.

In order to protect against occurrence of such a space, by the restraint process, the restraint material 76 is wound around the axis A as the center so as to surround the plurality of continuous fiber reinforced plastics 32 (the continuous fiber reinforced plastic layer 32-1) applied to the level difference portions 72, 74. More specifically, the restraint material 76 is wound at the position of the lower steps of the level difference portions 72, 74. The restraint material 76 is formed of continuous fiber reinforced plastics, for instance. The restraint material 76 restricts the movement of the plurality of continuous fiber reinforced plastics 32 (the continuous fiber reinforced plastic layer 32-1) to the radially outer side of the mold 40 at the level difference portions 72, 74, and causes the continuous fiber reinforced plastics 32 to keep track of the shape of the outer circumferential surface 50 of the mold 40.

In addition, the restraint material 78 is wound at a position at which the continuous fiber reinforced plastics 32 is folded back, that is, a position at which lamination of the continuous fiber reinforced plastic layer 32-1 is finished. The restraint material 78 fixes the plurality of continuous fiber reinforced plastics 32 (the continuous fiber reinforced plastic layer 32-1) to each fold-back position.

The restraint process may be performed after the fiber installation process is completed or immediately after the continuous fiber reinforced plastics 32 passes through the level difference portions 72, 74 during the fiber installation process.

The first fiber lamination process is a process which is performed after the fiber installation process and the first restraint process, and in which the plurality of continuous fiber reinforced plastics 32 is applied and laminated on the continuous fiber reinforced plastic layer 32-1 fully placed on the mold 40, with substantially in parallel so as to be aligned with the direction of the axis A of the mold 40. After the continuous fiber reinforced plastic layer 32 fully placed on the cap 46A of the mold 40 is folded back, the continuous fiber reinforced plastics 32 is applied and laminated to the continuous fiber reinforced plastic layer 32-1 while the mold 40 is moved in the D1 direction. At this point, similarly to the fiber installation process, each of the continuous fiber reinforced plastics 32 is guided over the continuous fiber reinforced plastic layer 32-1 so that the plurality of continuous fiber reinforced plastics 32 is substantially arranged in parallel without space in the direction of the axis A of the mold 40. The mold 40 is moved in the D1 direction, and when the position, at which the continuous fiber reinforced plastics 32 is applied to the continuous fiber reinforced plastic layer 32-1, exceeds a flange 52A of the cap 46A of the mold 40, the first fiber lamination process is terminated. In this manner, the plurality of continuous fiber reinforced plastics 32 is applied to the continuous fiber reinforced plastic layer 32-1, and continuous fiber reinforced plastic layer 32-2 as the second layer is formed.

After the first fiber lamination process, a second restraint process equivalent to the first restraint process is performed. Subsequent to this, the xth (x≥2) fiber lamination process and the (x+1)th restraint process are successively performed. The direction of guidance of the continuous fiber reinforced plastics 32, that is, the direction of movement of the mold 40 is reversed between an odd-numbered fiber lamination process and an even-numbered fiber lamination process. It is to be noted that xth or later restraint process may be performed after the (x−1)th fiber lamination process or during the (x−1)th fiber lamination process.

Figure 5A:
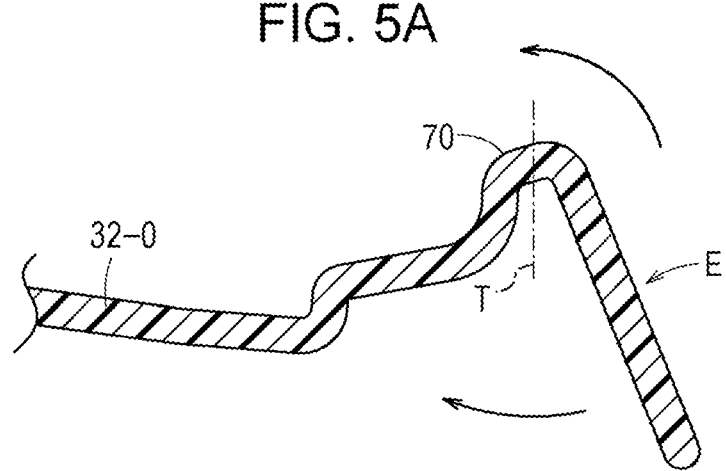
FIG. 5A, FIG. 5B, FIG. 5C are each a view for explaining a process of manufacturing the flange.
Figure 5B:
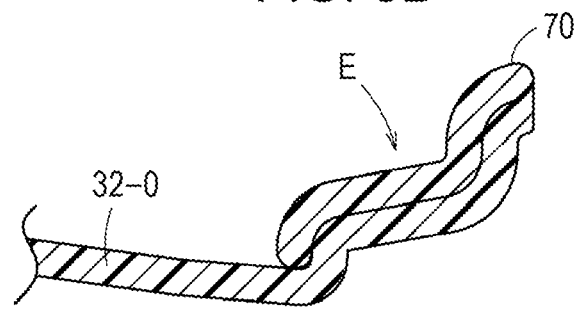
Figure 5C:
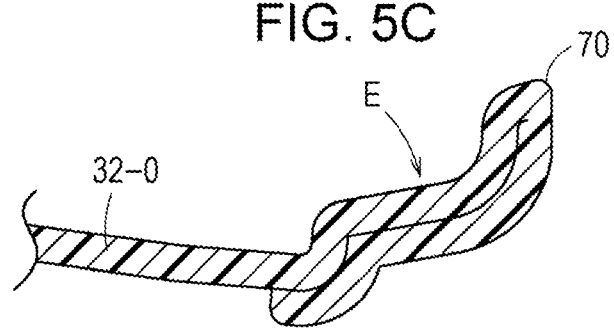

In the present embodiment, after the lamination of all continuous fiber reinforced plastic layers 32-1, . . . , 32-n is completed, the flange formation process is performed. The flange formation process is a process in which the edge E of the laminated body 32-0 in which the continuous fiber reinforced plastics 32 are laminated is folded back to the outer circumferential surface side or the inner circumferential surface side of the laminated body 32-0 after all fiber lamination processes are performed. As illustrated in FIG. 3A and FIG. 3B, the edge E of the laminated body 32-0 including all continuous fiber reinforced plastic layers 32-1, . . . , 32-n is attached to the surface of the caps 46A, 46B. After the lamination of continuous fiber reinforced plastics 32 is completed, as illustrated in FIG. 5A, FIG. 5B, FIG. 5C, the edge E of the laminated body 32-0 is folded back to the outer circumferential surface side or the inner circumferential surface side of the laminated body 32-0 at fold-back position T. This allows the thickness of a flange 70 to be increased to enhance the strength of the flange 70.

After the processes above, an outer circumference mold, a surface mold are further added and heat treatment is applied to the mold 40 in which the laminated body 32-0 is formed. The mold 40 is removed after the continuous fiber reinforced plastics 32 is hardened, and thus the wheel 10 including the two rims 12 and the spoke 16 is taken out. The rim 12, the hub 14, and the spoke 16 are integrally formed in the wheel 10.

According to the present embodiment, the continuous fiber reinforced plastic layer 32-$n$ laminated to the outer circumferential surface 50 of the mold 40 is restricted from moving to the radially outer side of the mold 40, and thus it is possible to cause the plurality of continuous fiber reinforced plastics 32 to keep track of the mold 40 for rim formation having a concave shape and to be applied and laminated substantially in parallel so as to be aligned with the direction of the axis A of the mold 40. Therefore, it is possible to laminate the continuous fiber reinforced plastics 32 with high accuracy around the mold 40 for rim formation of the wheel 10 that has a concave shape in the outer circumference width direction. Furthermore, a rim laminated body having a predetermined thickness may be laminated quickly, and thus the time taken for the lamination may be reduced.

[Other Embodiments]

It is to be noted that naturally the present disclosure is not limited to the above-described embodiment and various configurations may be adopted in a range without departing from the gist of the present disclosure. For instance, as illustrated in FIG. 3A and FIG. 3B, it is also possible to use a mold for rim formation only to form the rim 12 and to attach the spoke 16 later without using the molds 42A, 42B for spoke formation as the mold 40 for rim formation.

It is also possible to move the guide device 60 without moving the mold 40 (instead of moving the mold 40).

In the fiber installation process and the fiber lamination process, the mold 40 may be moved in the D1 direction and the D2 direction without being rotated around the axis A as the center. In this case, as illustrated in FIG. 4, the continuous fiber reinforced plastics 32A to be installed and laminated is parallel to the axis A. Alternatively, the mold 40 may be moved in the D1 direction and the D2 direction while being rotated around the axis A as the center. In this case, as illustrated in FIG. 4, the continuous fiber reinforced plastics 32$b$, 32C to be installed and laminated are inclined with respect to the axis A. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A method of manufacturing a wheel rim, comprising steps of:
    placing a plurality of continuous fiber reinforced plastics on an outer circumferential surface of a mold for forming a rim, the continuous fiber reinforced plastics being placed substantially in parallel to each other and substantially aligned with an axial direction of the mold and substantially covering the outer circumferential surface of the mold to form a continuous fiber reinforced plastic layer;
    winding a restraint material over the continuous fiber reinforced plastic layer disposed at a level difference portion of the mold after the step of placing the continuous fiber reinforced plastics or during the step of placing the continuous fiber reinforced plastics, the restraint material being configured to restrict movement of the continuous fiber reinforced plastics to a radially outer direction of the mold; and
    layering the continuous fiber reinforced plastics by applying the continuous fiber reinforced plastics to the continuous fiber reinforced plastic layer applied to the mold after the step of placing the continuous fiber reinforced plastics and the step of winding the restraint material, the continuous fiber reinforced plastics being applied substantially in parallel to each other and substantially aligned with the axial direction of the mold.

2. The method of manufacturing a wheel rim according to claim 1, further comprising
    after laminating one or more continuous fiber reinforced plastic layer, folding back an edge of a laminated body, in which the continuous fiber reinforced plastics are laminated, to an outer circumferential surface side or an inner circumferential surface side of the laminated body.

3. The method of manufacturing a wheel rim according to claim 1, wherein the outer circumferential surface of the mold has the level difference portion, and the restraint material is placed at a lower level portion of the outer circumferential surface of the mold.

4. The method of manufacturing a wheel rim according to claim 1, wherein the mold has a column shape or a tube shape, and the restraint material is placed along a circumference direction of the mold.

5. The method of manufacturing a wheel rim according to claim 1, wherein the axial direction of the mold is a width direction of the wheel rim.

6. The method of manufacturing a wheel rim according to claim 5, wherein a first layer of the continuous fiber reinforced plastics is applied by relatively moving the mold in one direction along the axial direction of the mold, and a second layer of the continuous fiber reinforced plastics is applied by relatively moving the mold in an opposite direction opposite to the one direction.

7. The method of manufacturing a wheel rim according to claim 6, wherein after the first layer of the continuous fiber reinforced plastics is applied, the continuous fiber reinforced plastics are folded back to the one direction.

8. The method of manufacturing a wheel rim according to claim 6, wherein the first layer of the continuous fiber reinforced plastics is applied by rotating the mold about the axis of the mold.

9. The method of manufacturing a wheel rim according to claim 1, wherein the continuous fiber reinforced plastic is a continuous filament of fiber reinforced plastic.

* * * * *